(12) United States Patent
Hara et al.

(10) Patent No.: US 8,194,363 B2
(45) Date of Patent: Jun. 5, 2012

(54) THIN FILM MAGNETIC HEAD PROVIDED WITH DUAL SYNTHETIC FREE LAYERS

(75) Inventors: Shinji Hara, Tokyo (JP); Yoshihiro Tsuchiya, Tokyo (JP)

(73) Assignee: TDK Corporation, Tokyo (JP)

( * ) Notice: Subject to any disclaimer, the term of this patent is extended or adjusted under 35 U.S.C. 154(b) by 539 days.

(21) Appl. No.: 12/379,624

(22) Filed: Feb. 26, 2009

(65) Prior Publication Data

US 2010/0214700 A1 Aug. 26, 2010

(51) Int. Cl.
*G11B 21/24* (2006.01)

(52) U.S. Cl. .................... 360/324.12; 360/314

(58) Field of Classification Search .............. None
See application file for complete search history.

(56) References Cited

U.S. PATENT DOCUMENTS

| 5,576,914 | A | 11/1996 | Rottmayer et al. | |
|---|---|---|---|---|
| 6,724,583 | B2 | 4/2004 | Seigler et al. | |
| 2002/0191348 | A1* | 12/2002 | Hasegawa et al. | 360/314 |
| 2010/0085666 | A1* | 4/2010 | Zhou et al. | 360/324.12 |

FOREIGN PATENT DOCUMENTS

| JP | A-11-96516 | 4/1999 |
|---|---|---|
| JP | A-2001-76323 | 3/2001 |
| JP | A-2001-143223 | 5/2001 |
| JP | A-2002-299723 | 10/2002 |
| JP | A-2002-319112 | 10/2002 |
| JP | A-2007-49118 | 2/2007 |

* cited by examiner

*Primary Examiner* — Holly Rickman
*Assistant Examiner* — Linda Chau
(74) *Attorney, Agent, or Firm* — Posz Law Group, PLC

(57) ABSTRACT

A thin film magnetic head includes a first through fourth free layers, a spacer layer, and a bias magnetic field application layer. The first and second free layers are magnetized in opposite directions of each other in the orthogonal direction to the ABS when the bias magnetic field is applied to the first and second free layers, and are exchange-coupled such that an angle between the magnetization direction of the bias magnetic field and the first free layer is acute and such that an angle between the magnetization direction of the bias magnetic field and the second free layer is acute. Similarly, the third and fourth layers have the same configuration.

7 Claims, 9 Drawing Sheets

THIN FILM MAGNETIC HEAD PROVIDED WITH DUAL SYNTHETIC FREE LAYERS

BACKGROUND OF THE INVENTION

1. Field of the Invention

The present invention relates to thin film magnetic heads. Specifically, the present invention relates to the structure of a thin film magnetic head that detects a magnetic field by the change in the relative angle of the magnetization direction in two free layers.

2. Description of the Related Art

As the high recording density of a hard disk drive (HDD) has been developed, a gain of performance of thin film magnetic heads has been required. A composite type thin film magnetic head that has the laminated structure of two heads, a reproducing head that has a magnetoresistive effect element (MR element) for reading and a recording head that has the induction type electromagnetic conversion element for writing, is widely used.

It is known in recent years that an upper shield film, a MR element, and a lower shield film are electrically connected in series, and a head structure in which an insulation layer between the shield films is unnecessary. Such a structure is called a current perpendicular to plane (CPP) structure. To achieve the recording density of 700 Gbits/in$^2$ or more, a giant magnetoresistive magnetoresistive (CPP-GMR) element that uses the CPP structure is an indispensable technology.

The laminated structure of a typical CPP-GMR element is as followings: a lower electrode layer/a base layer/an antiferromagnetic layer/a pinned layer/a spacer layer/a free layer/a cap layer/an upper electrode layer. In the specification, the mark of A/B/C means that the each level of layer, A, B, and C is laminated in this order. As to the pinned layer, the magnetization direction is fixed by exchange coupling with the antiferromagnetic layer. As to the free layer, the magnetization direction is fixed to a direction that is roughly orthogonal in the magnetization direction of the pinned layer if the external magnetic field is not applied. However, once the external magnetic field is applied, it rotates the magnetization direction according to the external magnetic field. This layer structure is called a spin valve (SV) or SV layer.

In an actual head, the distance between the upper electrode layer and the lower electrode layer, which function as the shield, influences BPI (bit per inch: track recording density) directly. This distance is called a read gap, and making a narrow read gap is an essential requirement for HDD with a high recording density. In the CPP-GMR element mentioned above, the antiferromagnetic layer is needed for the fixation of the magnetization direction of the pinned layer, and therefore, it is an obstacle for making the narrow read gap. It is expected that a minimum read gap is about 20 nm or more as long as the SV layer is adopted, and there is a possibility that the read gap demarcates the high recording density limit.

The specification of U.S. Pat. No. 5,576,914, the specification of U.S. Pat. No. 6,724,583, and others disclose the structure, such as a lower electrode layer/a base layer/a first free layer/a spacer layer/a second free layer/a cap layer/an upper electrode layer. In this structure, the magnetization direction in two free layers is changed according to the external magnetic field, and the output is decided depending on the relative angle of the magnetization direction in two free layers. It is possible to make a narrow read gap vastly because the antiferromagnetic layer is not required in this structure. In this specification, the layer structure that has two such free layers is called a dual free structure.

In order to have the situation where the magnetization direction in two free layers is rotated according to the external magnetic field, and the response to the magnetic field from the medium is maximized, it is ideal that the magnetization directions in two free layers are nearly orthogonal to each other when the magnetic field from the medium is zero (0). After the two free layers are antiferromagnetically coupled and the magnetization directions are mutually antiparallel, the bias magnetic field is applied to the two free layers in an orthogonal direction to the opposite side of the medium (or an air bearing surface; hereinafter ABS). The magnetization directions of the two free layers are provided in the mutually orthogonal direction by the above described operations.

The effect of Ruderman-Kittel-Kasuya-Yosida (RKKY) through the spacer layer can be used to antiferromagnetically couple the two free layers. For instance, in the situation where the layer structure is CoFe/Ru/CoFe, it is known that if the layer thickness of Ru is 0.7~0.9 nm, the magnetization directions in the two CoFe layers are antiparallel due to the RKKY effect. This phenomenon is used to construct the synthetic pinned structure in the SV layer. It is also well-known that the layer structure of CoFe/Cu/CoFe can achieve an antiferromagnetic coupling. Because Cu is a material generally used as a spacer layer, the CoFe/Cu/CoFe structure or its similar layer structure can be used for a free layer/a spacer layer/a free layer of the above mentioned dual free structure.

However, a spacer material in the layer structure of the dual free structure that fulfills many requirements is required severe demands, such as showing the RKKY effect, transmitting spin information of the electron efficiently, and having an ideal resistance as an MR element. Although Cu shows the RKKY effect and Cu is excellent in transmitting spin information, Cu is not practical due to the low output because the resistance is too low. Ru is poor in transmitting spin information and its resistance is too low. Under the current technology, it is difficult to provide the thin film magnetic head that has the output performance equal with a conventional CPP-GMR element and that is easy to make the narrow read gap.

SUMMARY OF THE INVENTION

The present invention relates to a thin film magnetic head that detects an external magnetic field by the change in the relative angle of the magnetization directions of two free layers. The object of the present invention is to provide a thin film magnetic head that is able to have the output performance equal to a conventional CPP-GMR element. The object of the present invention is also to provide a hard disk drive device with such a thin film magnetic head.

The thin film magnetic head according to the present invention includes a first synthetic free layer that has a first free layer and a second free layer of which the magnetization directions change according to an applied magnetic field, and a first exchange coupling layer that is provided between the first and second free layers and that is for the first and second free layers, a second synthetic free layer that has a third free layer and a fourth free layer of which the magnetization directions change according to the applied magnetic field, and a second exchange coupling layer that is provided between the third and fourth free layers and that exchange-couples the third and fourth free layers, a spacer layer that is provided between the second free layer and the third free layer, and that has a magnetoresistive effect, and a bias magnetic field application layer that is provided in a rear side of the first synthetic free layer and the second synthetic free layer seen from an air bearing surface (ABS), and that applies a bias magnetic field to the first and second synthetic free layers in an orthogonal direction to the ABS. A sense current flows in a direction orthogonal to surfaces of the first synthetic free layer, the second synthetic free layer, and the spacer layer, the first and second layers are magnetized in opposite directions of each other in the orthogonal direction to the ABS when the bias magnetic field is applied to the first and second free layers, and are exchange-coupled such that an angle between the magnetization direction of the bias magnetic field and the first free layer is acute and that an angle between the magnetization direction of the bias magnetic field and the second free layer is acute, and the third and fourth layers are magnetized in opposite directions of each other in the orthogonal direction to the ABS when the bias magnetic field is applied to the third and fourth free layers, and are exchange-coupled such that an angle between the magnetization direction of the bias magnetic field and the third free layer is acute and that an angle between the magnetization direction of the bias magnetic field and the fourth free layer is acute.

The magnetization directions in the first and second free layers change by the strength of the bias magnetic field and power of exchange-coupling, although the first and second free layers are exchange-coupled with the first exchange coupling layer. In a virtual situation where a very weak bias magnetic field is applied in the orthogonal direction to the ABS, the first and second free layers are magnetized in an anti-parallel manner to each other in the track width direction. The term "antiparallel" means that the magnetization directions are parallel and one magnetization direction is opposite to another magnetization direction. Contrarily, in a virtual situation where a very strong bias magnetic field is applied in the orthogonal direction to the ABS, the first and second free layers are completely magnetized in the magnetization direction of the bias magnetic field.

In the present embodiment, when the bias magnetic field is applied to the first and second free layers, the first and second free layers are magnetized in a different angle direction relative to each other with respect to the orthogonal direction to the ABS, and are exchange-coupled in the situation where both angles between the magnetization directions of the bias magnetic field and the first free layer, and the bias magnetic field and the second free layer, are acute. The third and fourth free layers have the same situation. If the strength of the bias magnetic field is set adequately, the magnetization directions of the first free layer and second free layer, or the third free layer and fourth free layer, are respectively controlled in the approximately orthogonal direction relative to each other. The second free layer and the third free layer are magnetized in a different angle direction, preferably in an orthogonal direction, relative to each other with respect to the orthogonal direction to the ABS in order to minimize the magnetostatic energy of the whole system. The part that comprises the second free layer/the spacer layer/the third free layer generates resistance-changes because the spacer layer, which has the magnetoresistive effect, is provided between the second free layer and the third free layer.

Thus, in the present invention, the two synthetic free layers have a role in which the magnetization direction of the two free layers (the second free layer and the third free layer) is in a different angle direction relative to each other with respect to the orthogonal direction to the ABS, and the part that comprises the second free layer/the spacer layer/the third free layer has a role that generates the magnetoresistive effect. The above mentioned two roles were required for a spacer layer for a thin film magnetic head with the dual free structure in the past; however, in the present invention, these roles are achieved in different parts respectively. In conclusion, the present invention can provide appropriate materials for a layer that are suitable for roles to be achieved, and achieve the above mentioned object.

Another embodiment of the present invention can provide a slider that has the above mentioned thin film magnetic head, and a wafer where a laminated body for the above mentioned thin film magnetic head is formed.

Yet another embodiment of the present invention can provide a head gimbal assembly that comprises the above mentioned slider and a suspension that elastically supports the slider.

Yet another embodiment of the present invention can provide a hard disk drive that comprises the above mentioned slider, and a unit that supports the slider and locates the position of the slider in the direction to the recording medium.

The aforementioned objects, other objects, characteristics, and advantages of the present invention will be described below in more detail with reference to attached drawings illustrating the embodiment of the present invention.

DETAILED DESCRIPTION OF THE INVENTION

A description of the MR element and a thin film magnetic head with the MR element for a hard disk device according to one embodiment of the present invention is given below with reference to drawings.

Figure 1:
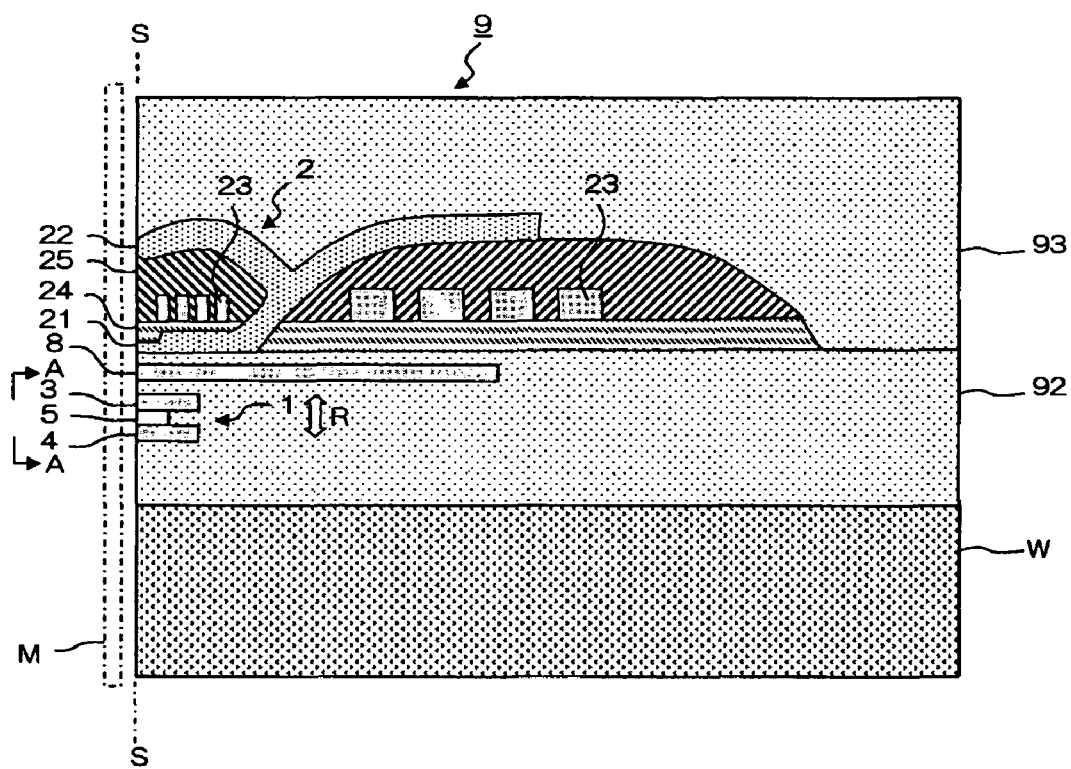
FIG. 1 is a sectional view of a main part of the thin film magnetic head according to one embodiment of the present invention.
Figure 2:
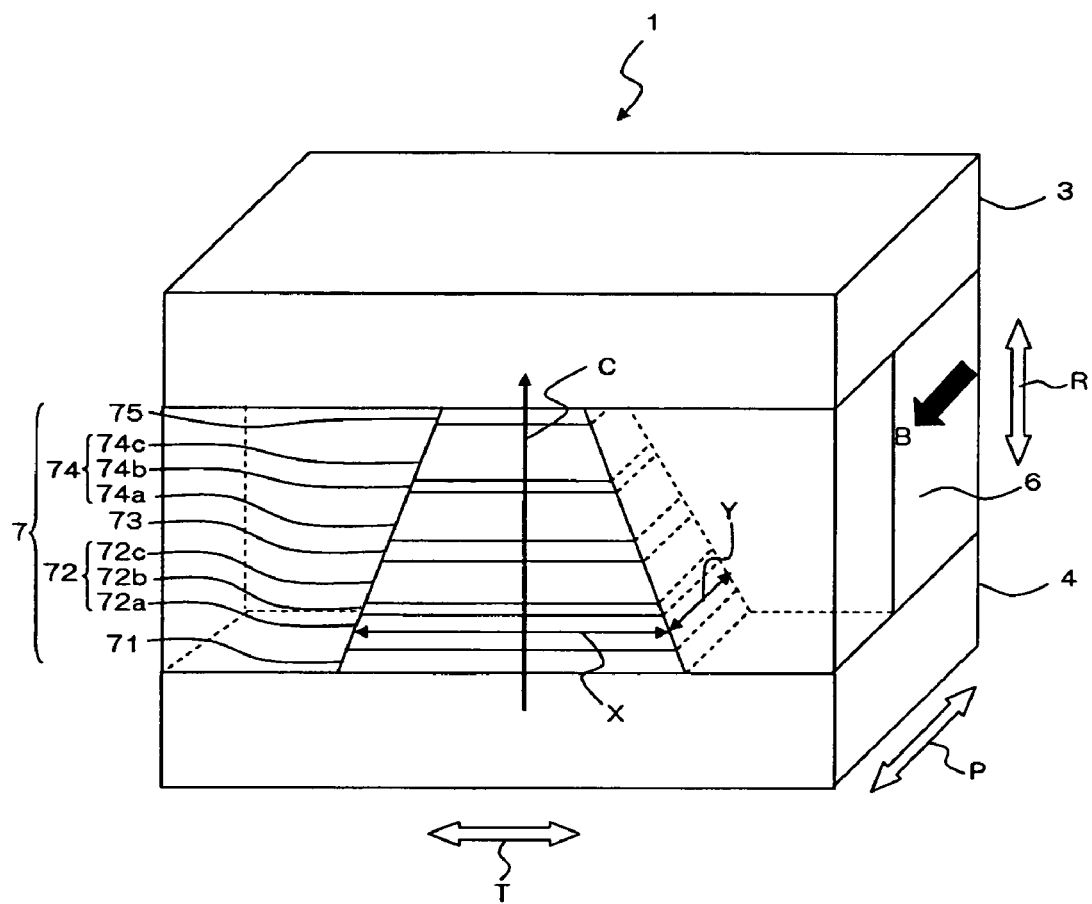
FIG. 2 is a perspective view of a main part of a reading head seen from the A-A direction (namely the ABS S) in FIG. 1.

FIG. 1 is a sectional view of a main part of such the thin film magnetic head. A thin film magnetic head 9 comprises a reading head 1 and a recording head 2. Those are formed on a substrate W. FIG. 2 is a perspective view of a main part of the reading head seen from the A-A direction in FIG. 1, namely the ABS S. The ABS S is defined as a surface of the thin film magnetic head 9, which faces a recording medium M. First, as shown in FIG. 2, an explanation of the structure of the reading head 1 will be given.

The reading head 1 includes an MR element 7 made with several layers that are laminated, and an upper shield electrode layer 3 and a lower shield electrode layer 4 that sandwich the MR element 7 in a film surface orthogonal direction (laminated direction) R. The edge portion of the MR element 7 is, as shown in FIG. 1, provided to expose at the ABS S.

Table 1 shows examples of film configurations of the MR element 7. Table 1 shows laminated layers from a buffer layer 71 that contacts the lower shield electrode layer 4 to a cap layer 75 that contacts the upper shield electrode layer 3 from the bottom up.

TABLE 1

| Layer Configuration | | Composition | Thickness (nm) Sample A | Sample B |
|---|---|---|---|---|
| Cap Layer 75 | | Ta | 1.0 | 1.0 |
| | | Ru | 2.0 | 2.0 |
| 2nd Synthetic Free Layer 74 | 4th Free Layer 74c | NiFe | 1.5 | 1.2 |
| | | CoFe | 1.0 | 1.0 |
| | 2nd Exchange-Coupling layer 74b | Ru | 0.7 | 0.7 |
| | 3rd Free Layer 74a | NiFe | 1.5 | 1.5 |
| | | CoFeB | 1.7 | 2.0 |
| Spacer Layer 73 | | MgO | 1.0 | 1.0 |
| 1st Synthetic Free Layer 72 | 2nd Free Layer 72c | CoFeB | 1.7 | 1.5 |
| | | NiFe | 1.5 | 1.5 |
| | 1st Exchange-Coupling Layer 72b | Ru | 0.7 | 0.7 |
| | 1st Free Layer 72a | CoFe | 1.0 | 1.0 |
| | | NiFe | 1.5 | 1.7 |
| Buffer Layer 71 | | NiCr | 2.0 | 2.0 |
| | | Ta | 1.0 | 1.0 |
| | | Total Thickness | 19.8 | 19.8 |

The MR element 7 has a film configuration, such as a buffer layer 71, a first synthetic free layer 72, a spacer layer 73, a second synthetic free layer 74 and a cap layer 75 in this order on the lower shield electrode layer 4 made of NiFe with a thickness of about 1-2 µm. Namely, it could be said that the thin film magnetic head according to the present embodiment adopts a dual synthetic free structure.

The first synthetic free layer 72 that is formed from the first and second free layers 72a, 72c and the first exchange coupling layer 72b disposed between the first and second free layers 72a, 72c is formed on the buffer layer 71 that is laminated by Ta and NiCr. The first and second free layers 72a, 72c are respectively made of laminated bodies of NiFe and CoFe, and NiFe and CoFeB, and are a magnetic layer in which the magnetization direction is varied depending on the applied magnetic field. The first exchange coupling layer 72b is made of Ru (ruthenium), and is able to exchange couple the first and second free layers 72a, 72c. The buffer layer 71 is provided as a base layer for the first synthetic free layer 72.

The second synthetic free layer 74 is formed in the opposite side of the first synthetic free layer 72 through the spacer layer 73, and comprises the third and fourth free layers 74a, 74c, and the second exchange coupling layer 74b between the third and fourth free layers 74a, 74c. The third and fourth free layers 74a, 74c are laminated bodies respectively made of CoFeB and NiFe, and CoFe and NiFe, and are magnetic layers of which the magnetization directions vary depending on the applied magnetic field. The second exchange coupling layer 74b is made of Ru (ruthenium), and is able to exchange-couple the third and fourth free layers 74a and 74c.

The cap layer 75 is formed to prevent deterioration of each layer of the laminated layers. The upper shield electrode layer 3 is provided on the cap layer 75, and is made of NiFe with a thickness of about 1-2 µm.

Because of the applied voltage between the upper shield electrode layer 3 and the lower shield electrode layer 4, a sense current flows in a film surface orthogonal direction R of the first and second synthetic free layers 72, 74, and the spacer layer 73. The "orthogonal direction" means that it is not only the case where the direction of the sense current C is rigidly orthogonal to the film surfaces, but also the case where it is substantially orthogonal to the film surfaces. A magnetic field of a recording medium M that is provided in the opposite position to the MR element 7 varies in correspondence with the rotation of the recording medium M. The change of the magnetic field is detected as electrical resistance change based on the magnetoresistive effect. The MR element 7 reads magnetic information written in the recording medium M through this principle.

The upper shield electrode layer 3 and the lower shield electrode layer 4 have the function as the magnetic shield for the MR element 7, and a gap between the upper shield electrode layer 3 and the lower shield electrode layer 4 in the film surface orthogonal direction R is a read gap.

A bias magnetic field application layer 6 that is made of CoPr, or CoCrPr, and so on is provided in the rear side of the first synthetic free layer 72 and the second synthetic free layer 74 seen from the ABS S. The bias magnetic field application layer 6 is magnetized in the orthogonal direction P relative to the ABS S and applies the bias magnetic field to the first and second synthetic free layers 72, 74 in the direction B (as a black bold arrow in the figure).

Referring to FIG. 1 again, the recording head 2 is provided above the reading head 1 through an interelement shield layer 8 that is formed by a sputtering method, or the like. The recording head has the structure for so-called perpendicular magnetic recording. A magnetic pole layer for recording comprises a main magnetic pole layer 21 and an auxiliary magnetic pole layer 22. These magnetic pole layers 21, 22 are formed by a frame plating method or another method. The main magnetic pole layer is made of FeCo, and is exposed at the ABS S in the orthogonal direction to the ABS S. A coil layer 23 is wound around the main magnetic pole layer 21, and extends over a gap layer 24 that is made of an insulating material, so that the magnetic flux is induced to the main magnetic pole layer 21 by the coil layer 23. The coil layer 23 is formed by a frame plating method or the like. The magnetic flux is guided through the inside of the main magnetic pole layer 21, and is emitted toward the recording medium from the ABS S. The main magnetic pole layer 21 has a narrowed size around the ABS S, not only in the film surface orthogonal direction R, but also in the direction of the track width direction T (refer to FIG. 2). Therefore, it generates a minute and strong writing magnetic field that is suitable for high recording density.

The auxiliary magnetic pole layer 22 is a magnetic layer that is magnetically connected with the main magnetic pole layer 21. The auxiliary magnetic pole layer 22 is a magnetic pole layer with the layer thickness of about 0.01-0.5 µm, and is an alloy, for example, that is made of either two or three of the following materials, Ni, Fe and Co. The auxiliary magnetic pole layer 22 is branched from the main magnetic pole layer 21, and faces the main magnetic pole layer 21 through the gap layer 24 and a coil insulating layer 25 in the ABS S. The edge portion of the auxiliary magnetic pole layer 22 in the ABS S forms a trailing shield part of which the layer cross section (area) in the edge portion is larger than other portions of the auxiliary magnetic pole layer 22. Because of providing the auxiliary magnetic pole layer 22, the magnetic field gradient between the auxiliary magnetic pole layer 22 and the main magnetic pole layer 21 is precipitous in the area near the ABS S. As a result, signal output jitter is small, and error rate of reading is small.

Insulating layers 92, 93 are provided in the area where the reading head 1 and recording head 2 that are explained above do not exist.

Figure 3A:
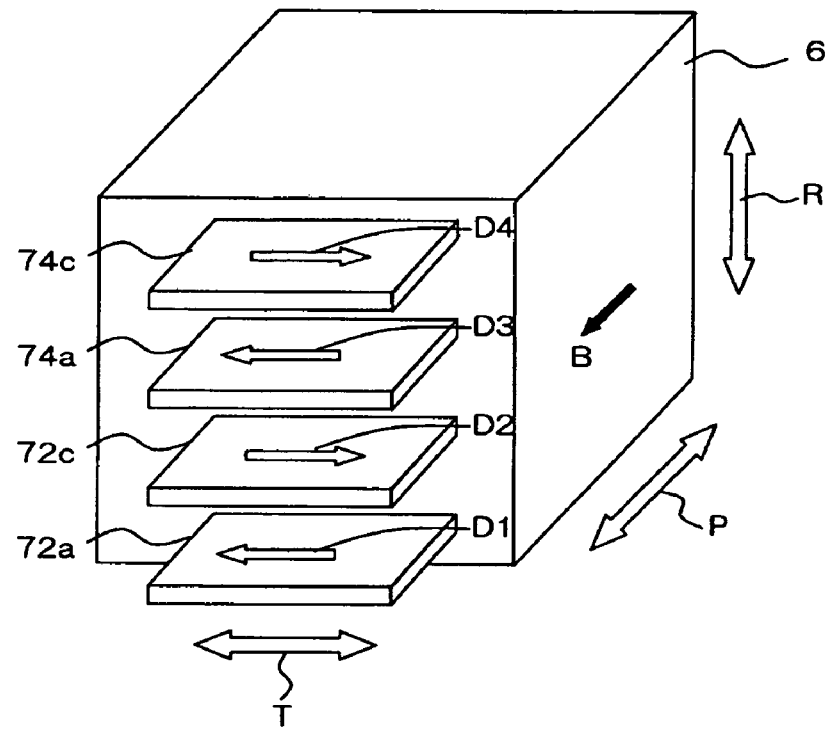
FIGS. 3A-3D are schematic views of several magnetization states of the synthetic free layer.

FIGS. 3A is a schematic view of a magnetization state of the first and second synthetic free layers in a virtual situation where the bias magnetic field from the bias magnetic field application layer 6 is very weak. In FIGS. 3A-3D, the bias magnetic field is shown as a black bold arrow, and its applied direction is in a parallel direction B (B is parallel to a direction P orthogonal to the ABS S). FIGS. 3A-3D are provided without the first exchange coupling layer 72b, the second exchange coupling layer 74b, and the spacer layer 73 for ease in understanding of the drawing. The first and second free layers 72a, 72c of the first synthetic free layer 72 are exchange-coupled such that the magnetization directions D1, D2 of the first and second free layers 72a, 72c are oriented in antiparallel directions to each other in the track width direction T.

Figure 3B:
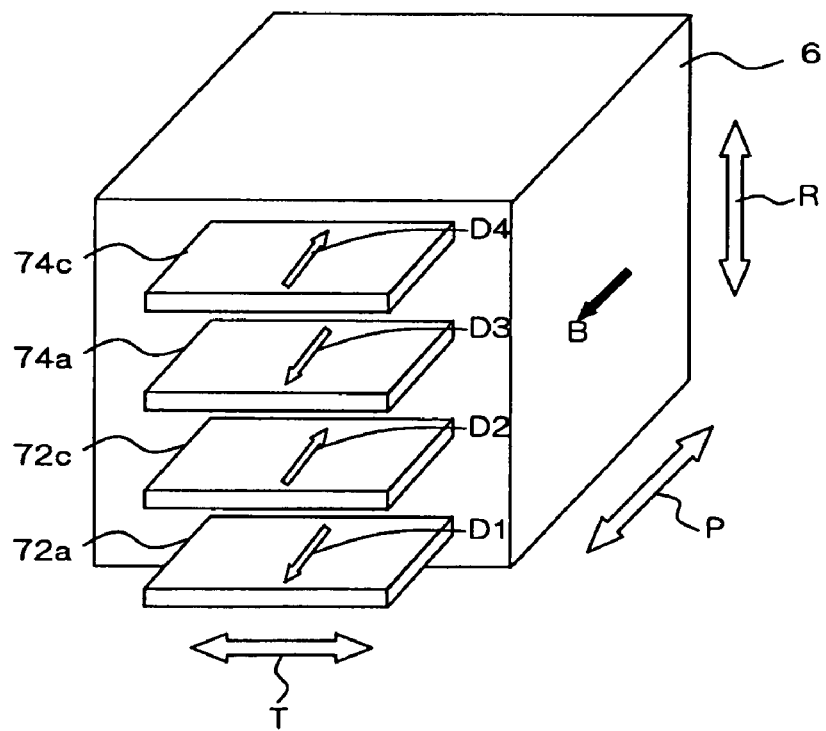

The magnetization directions D1, D2 of the first and second free layers 72a, 72c, respectively, could be magnetized in antiparallel directions to each other with respect to the direction P orthogonal to the ABS S in actual practice. This virtual situation is shown in FIG. 3B. However, by using various methods, the magnetization state shown in FIG. 3A could be obtained.

The first method is that the saturated magnetization (Ms) of the first free layer 72a is substantially equal to that of the second free layer 72c. This state is called "equally divided." The magnetic energies of the whole system in FIGS. 3A and 3B are $$-1/2\chi_\perp H^2 \text{ and}$$

$$-1/2\chi_{//} H^2, \text{ respectively,}$$

where $\chi_{//}$ represents a parallel magnetic susceptibility, $\chi_\perp$ represents perpendicular magnetic susceptibility, and H represents an external magnetic field. Because it always has a situation in which $\chi_\perp > \chi_{//}$, the state of FIG. 3B is in a large energy state and unstable. Namely, when a weak magnetic field is applied, the two free layers 72a, 72c that are antiferromagnetically coupled and equally divided are oriented in the orthogonal direction with respect to the applied magnetic field P as shown in FIG. 3A. The Aforementioned explanation is applied to the third free layer 74a and the fourth free layer 74c.

The second method is to use the shape anisotropy effect of the first through fourth free layers (72a, 72c, 74a, and 74c). Specifically, the first through fourth free layers (72a, 72c, 74a, and 74c) have thin and long structures in which the size X in the direction of the track width direction T is longer than the size Y in the orthogonal direction to the ABS S, namely the direction P of the height of the element. Therefore, the first through fourth free layers (72a, 72c, 74a, and 74c) are magnetized in the direction of the track width direction T with priority, so that it tends to become the state shown in FIG. 3A rather than the state shown in FIG. 3B.

The third method is that the magnetostriction of the first through fourth free layers (72a, 72c, 74a, and 74c) are configured in negative. In this case, the state shown in FIG. 3A is more stable than the state shown in FIG. 3B as well in the view of energy; therefore, the first through fourth free layers (72a, 72c, 74a, and 74c) are magnetized in the direction of the track width direction T with priority.

As described above, when a weak magnetic field is applied, there are several methods to magnetize the first through fourth free layers (72a, 72c, 74a, and 74c) in the track width direction T, and it would be possible to exercise two or more methods above together. The aforementioned methods are applied to the magnetization directions D3, D4 of the third free layer 74a and the fourth free layer 74c.

Figure 3C:
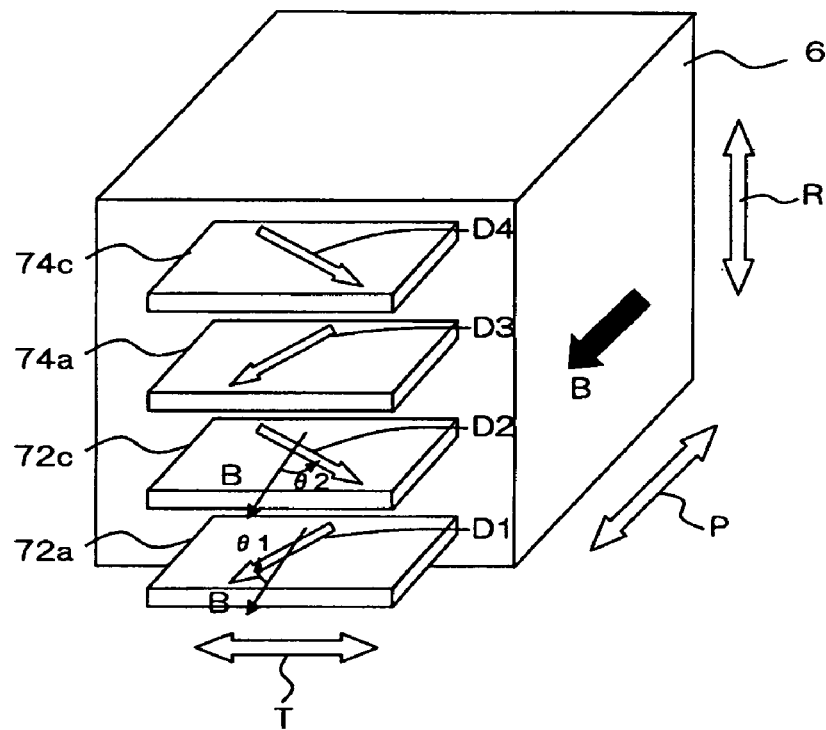
Figure 3D:
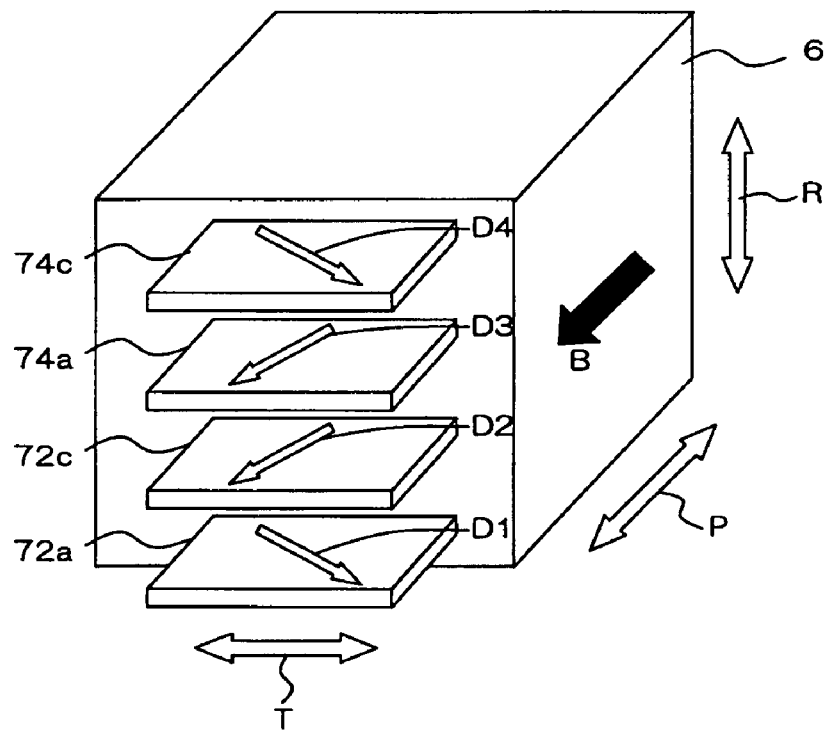

Next, a situation where the bias magnetic field is larger is described. FIG. 3C is a schematic view of magnetization of the first and second synthetic free layers when an ideal degree of the bias magnetic field is applied. When the bias magnetic field becomes large, the exchange couplings of the first and second free layers 72a, 72c through the exchange coupling layer 72b begin to cut, and both of the first and second free layers 72a, 72c start rotating toward the direction B of the applied bias magnetic field. When the bias magnetic field becomes very large, the magnetization directions of the first and second free layers 72a, 72c are completely consistent with the magnetization direction of the bias magnetic field.

However, as shown in FIG. 3C, when an appropriate degree of the bias magnetic field is applied, the first and second layers 72a, 72c are magnetized in a different angle direction relative to each other with respect to the orthogonal direction P to the ABS, and an angle θ1 between the magnetization direction B of the bias magnetic field and the magnetization direction D1 of the first free layer, and an angle θ2 between the magnetization direction B of the bias magnetic field and the magnetization direction D2 of the second free layer are both acute. Magnetizing in opposite directions of each other means that the angle θ1 with respect to the magnetization direction D1 of the first free layer 72a is positive where the angle is measured in a clockwise direction starting from the magnetization direction B of the bias magnetic field. It also means that the angle θ2 with respect to the magnetization direction D2 of the second free layer 72c is negative where the angle is measured in a clockwise starting from the magnetization direction B of the bias magnetic field. When the angle θ1 with respect to the magnetization direction B of the bias magnetic field and the magnetization direction D1 of the first free layer 72a is determined to be acute, the angle θ1 is greater than 0° and less than 90°. Similarly, when the angle θ2 with respect to the magnetization direction B of the bias magnetic field and the magnetization direction D2 of the second free layer 72c is determined to be acute, the angle θ2 is greater than 0° and less than 90°. The aforementioned explanation is applied to the second synthetic free layer 74 as well.

An appropriate degree of the bias magnetic field is obtained by controlling composition, size, annealed condition, and so on, with respect to the bias magnetic field layer 6. The appropriate degree of the bias magnetic field depends on an exchange coupling force of the first and second exchange coupling layers 72b, 74b.

There could be the case where the magnetization directions D2, D3 of the second free layer 72c and the third free layer 74a are the same. However, because the magnetostatic energy of the whole system of FIG. 3C is smaller than that of FIG. 3D, the state shown in FIG. 3D would not occur in actual practice. Therefore, when the first synthetic free layer 72 and the second synthetic free layer 74 are each configured properly, the state shown in FIG. 3C is automatically obtained.

When the bias magnetic field and the exchange coupling intensity are configured appropriately, angles of the magnetization directions D1 and D2 of the first and second free layers 72a, 72c from the magnetic application direction B of the external magnetic field are respectively configured 45° in opposite directions. Similarly, angles of the magnetization directions D3 and D4 of the third and fourth free layers 74a, 74c from the magnetic application direction B of the external magnetic field are respectively configured 45° in opposite directions. Moreover, as a result, angles of the magnetization directions D2 and D3 of the second and third free layer 72c, 74a from the magnetic application direction B of the external magnetic field are also configured 45° in opposite directions from each other; namely they are configured orthogonal to each other.

Figure 4:
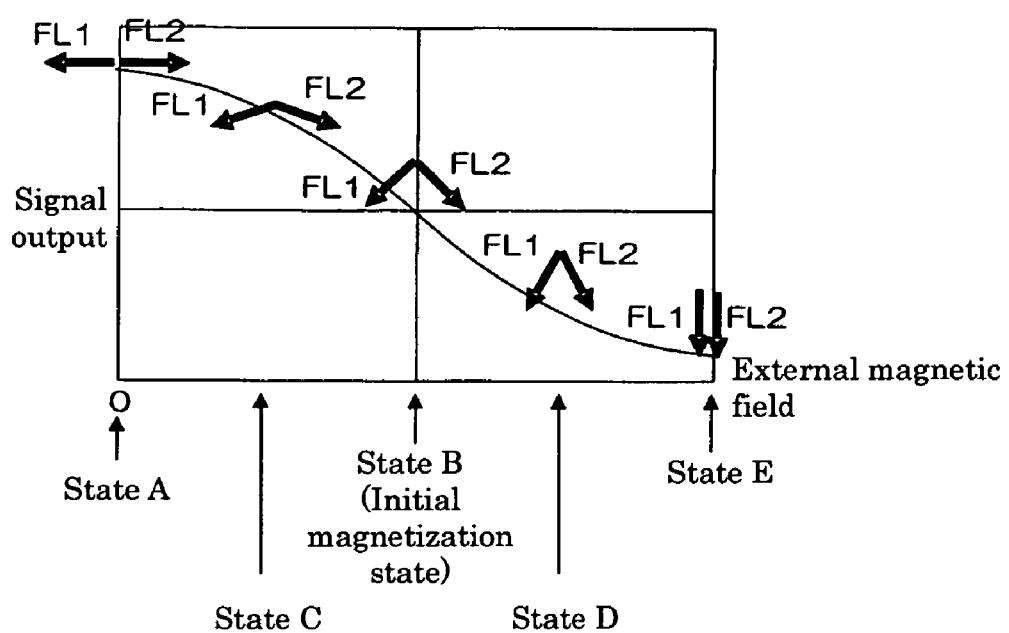
FIG. 4 is a schematic view showing the relationship between the external magnetic field and output signals of the MR element.

FIG. 4 is a schematic view showing the relationship between strength of a magnetic field that is applied to the first synthetic free layer and the second synthetic free layer, and output signals. In this figure, FL1 schematically represents the magnetization direction D1 of the first free layer 72a and the magnetization direction D3 of the third free layer 74a, and FL2 schematically represents the magnetization direction D2 of the second free layer 72c and the magnetization direction D4 of the fourth free layer 74c. The X axis shows the strength of the magnetic field, and the Y axis shows the output signal. The state A in FIG. 4 shows the state in FIG. 3A, and the magnetization direction D1 (FL1) of the first free layer 72a and the magnetization direction D2 (FL2) of the second free layer 72c are antiparallel to each other. It is also the same situation for the magnetization direction D3 of the third free layer 74a and the magnetization direction D4 of the fourth free layer 74c. The state B in FIG. 4 shows the state in FIG. 3C, and because the appropriate strength of the bias magnetic field is applied, the magnetization direction D1 (FL1) of the first free layer 72a and the magnetization direction D2 (FL2) of the second free layer 72c are orthogonal to each other. It is also the same situation for the third free layer 74a and the fourth free layer 74c. This state is the initial state, and when the external magnetic field from a recording medium is applied, the state is moved to the state C or D depending on the direction of the applied magnetic field. The state E is the state where the strong external magnetic field is applied, the magnetization direction D1 of the first free layer 72a (the magnetization direction D3 of the third free layer 74a) and the magnetization direction D2 of the second free layer 72c (the magnetization direction D4 of the fourth free layer 74c) are aligned in the same direction, so that minimum resistance value is observed. If a strong external magnetic field is applied in the opposite direction to the state E, the bias magnetic field is an offset against the external magnetic field, and then it changes back to the state A. In this situation, maximum resistance is observed. As described above, an MR element detects direction and strength of the external magnetic field as changes of the output signals.

As obvious from FIG. 4, in the state B, a resistance change ratio (namely, slope of graph) with respect to changes of the external magnetic field is large and it has superior linearity. Accordingly, it is preferable that the magnetization direction D2 of the second free layer 72c and the magnetization direction D3 of the third free layer 74a are orthogonal.

In the thin film magnetic head according to the present embodiment, the two synthetic free layers 72 and 74 have the role that the magnetization directions of the second free layer 72c and the third free layer 74a are at different angles to each other with respect to the orthogonal direction to the ABS, and the portion of the second free layer 72c/the spacer layer 73/the third free layer 74a has the role that generates the magnetoresistive effect. Therefore, the spacer layer is freely configured only in view of the magnetoresistive effect. For example, when an insulating material, such as MgO, $Al_2O_3$, $TiO_2$, AlN, and so on, and a mixture, such as $Cu/Al_2O_3$, Cu/MgO, and so on, are used, a tunnel magneto-resistive (TMR) type dual free (dual synthetic free) structure is obtained. When a metal, such as Cu, Ag, Au, Cr, and so on, is used, the CPP-GMR type dual free structure is obtained. Further, when a semiconductor, such as ZnO, $SnO_2$, GaN, $In_2O_3$, and so on, is used, a spacer layer with higher resistance is obtained, so that a higher output CPP-GMR type dual free structure is obtained.

(Exemplary Embodiment)

An exemplary embodiment is described below. Samples of an MR element are manufactured according to the following procedures.

(1) After lower shield layers (NiFe) are formed by a plating method, sample A and sample B that have the structure shown in Table 1 are formed by magnetron sputtering method.

(2) After the layers are formed, annealing at 250° C. for three hours is conducted.

(3) The layers are processed into a column like structure with the size of 80 nm×60 nm, the sides of the layers are covered by an insulating layer ($Al_2O_3$), then a bias magnetic field application layer is formed at the rear side of the layers.

(4) An upper shield layer is formed, then 16 elements for each of CPP type sample A and sample B are formed.

Sample A are configured to have a predetermined layer thickness so that the first free layer 72a and the second free layer 72c have the same magnetic layer thickness Mst, wherein Mst is defined as a product of a magnetization per volume Ms times a layer thickness, and the third free layer 74a and that the fourth free layer 74c also have the same Mst. Here, the magnetizations per volume Ms of CoFe, NiFe, CoFeB are 1.7, 0.8, 1.0 A·m$^2$/cm$^3$ (1, 700, 800, 1,000 emu/cm$^3$), respectively. The magnetic layer thickness Mst is also called a magnetization per square because its unit is A·m$^2$/cm$^3$ (emu/cm$^2$).

In sample B, the thickness of the first free layer 72a is decreased and the thickness of the second free layer 72c is increased, compared with the sample A. Similarly, the thickness of the third free layer 74a is decreased, and the thickness of the fourth free layer 74c is increased, compared with the sample A. This is because an actual element (or an element in commercial use) is considered to have a column shape with a large foot print (or broaden toward the bottom, refer to FIG. 2) when the element is manufactured in a column-shape. Therefore, the sample B is close to an equally divided structure.

Table 2 shows a structure of sample C that is a conventional spin valve (SV) structure element for comparison purposes. According to the structure in the Table 2, a spacer layer exists between a reference layer of which magnetization direction is fixed, and a free layer of which a magnetization direction is oriented depending on the external magnetic field. The magnetization direction of the reference layer is fixed by exchange coupling with a pinned layer through an exchange coupling layer. The pinned layer is antiferromagnetically coupled by an antiferromagnetic layer that is made of IrMn. Bias magnetic application layers are provided at both sides of a SV layer in the track width direction, and this structure is different from those of sample A and sample B, which have a dual synthetic free structure. Although the sample C is configured with thinner layers forming an MR element, a thickness of a read gap is over 24 nm. As shown in this Table, the thickness of an antiferromagnetic layer is large, 6 nm, for enabling enough antiferromagnetic coupling. Therefore, the thickness of this layer is about one fourth of the total thickness of the SV layer. In contrast, the read gaps of the sample A and sample B, which have a dual synthetic free structure, are equal to or less than 20 nm, as shown in Table 1. There is a possibility that, under the current recording medium, it could not obtain any remarkable supremacy over the sample C in a case where the read gap is equal to or less than 20 nm because a particle size of a material forming the medium is relatively large. However, when the particle size of the medium is small enough in the future, a narrow read gap will obtain high resolution and a lower error rate, so that it is easy to realize the high track recording density. In conclusion, it is clear that the sample A and sample B have supremacy over the conventional spin valve structure (sample C).

TABLE 2

| Layer Configuration | Composition | Thickness (nm) |
| --- | --- | --- |
| Cap layer | Ta | 1.0 |
|  | Ru | 2.0 |
| Free layer | NiFe | 2.5 |
|  | CoFeB | 1.0 |
| Spacer Layer | MgO | 1.0 |
| Reference Layer | CoFeB | 1.0 |
|  | CoFe | 2.0 |
| Exchange Coupling Layer | Ru | 0.7 |
| Pinned Layer | CoFe | 3.0 |
| Antiferromagnetic Layer | IrMn | 6.0 |
| Buffer Layer | NiCr | 3.0 |
|  | Ta | 1.0 |
| Total Thickness |  | 24.2 |

Figure 5:
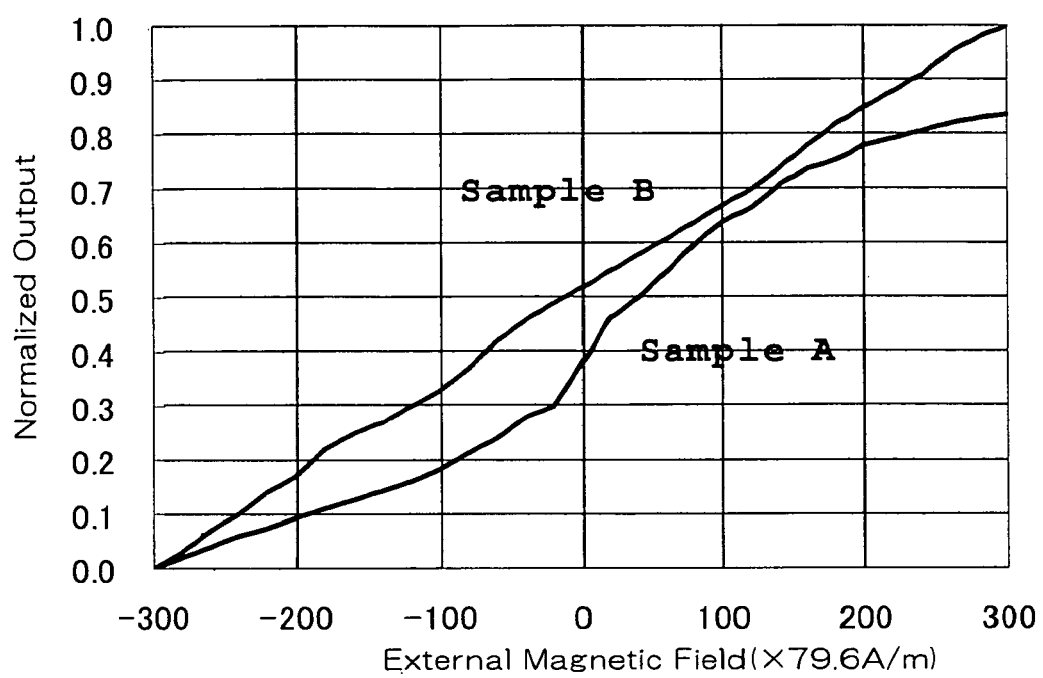
FIG. 5 is a graph showing the relationship between the external magnetic field and the output signals according to one embodiment.

An external magnetic field, about ±23.9 kA/m (±300 Oe), is applied to sample A and B, which are manufactured according to the above mentioned processes, and a magnetic field response of a resistance is observed. When the magnetic field, about ±23.9 kA/m (±300 Oe) is applied, the minimum resistance value at the time is used as a reference. The difference (resistance change) between the resistance and the minimum resistance times electric current value, and then outputs, which is calculated in a unit of electric voltage, are compared. Average output of sample B is about 13,100 µV, and standard deviation of output is about 6%. Average output of sample A is about 10,700 µV, and standard deviation of output is about 8%. FIG. 5 shows representative magnetic field response linearity of output for the sample A and sample B. For comparison purposes, the normalized value is used when the maximum output of the sample B is 1. It is confirmed that the sample A and sample B have linearity of magnetic field response. Although, as a whole, the sample B is better than the sample A with respect to output, dispersion of output, and magnetic field response linearity, the results, which are used for actual practices, are obtained for both the sample A and sample B.

When the error rates between the sample B that has better dual synthetic free structure and the sample C that has spin valve structure are compared, the equal results are obtained. It could be evaluated that the sample B has the same or better MR rate and output than the sample C.

There is slightly different result between the sample A and sample B because the relationship between the first free layer and the second free layer, and the third free layer and the fourth free layer in the sample B is closer to the equally divided situation than that of the sample A. In other words, although the sample A has proper enough characteristic for actual practice, it shifts a little bit from ideal magnetization state shown in FIG. 3A; therefore, there is a small difference in sufficiency of the above mentioned equally divided situation.

Figure 6:
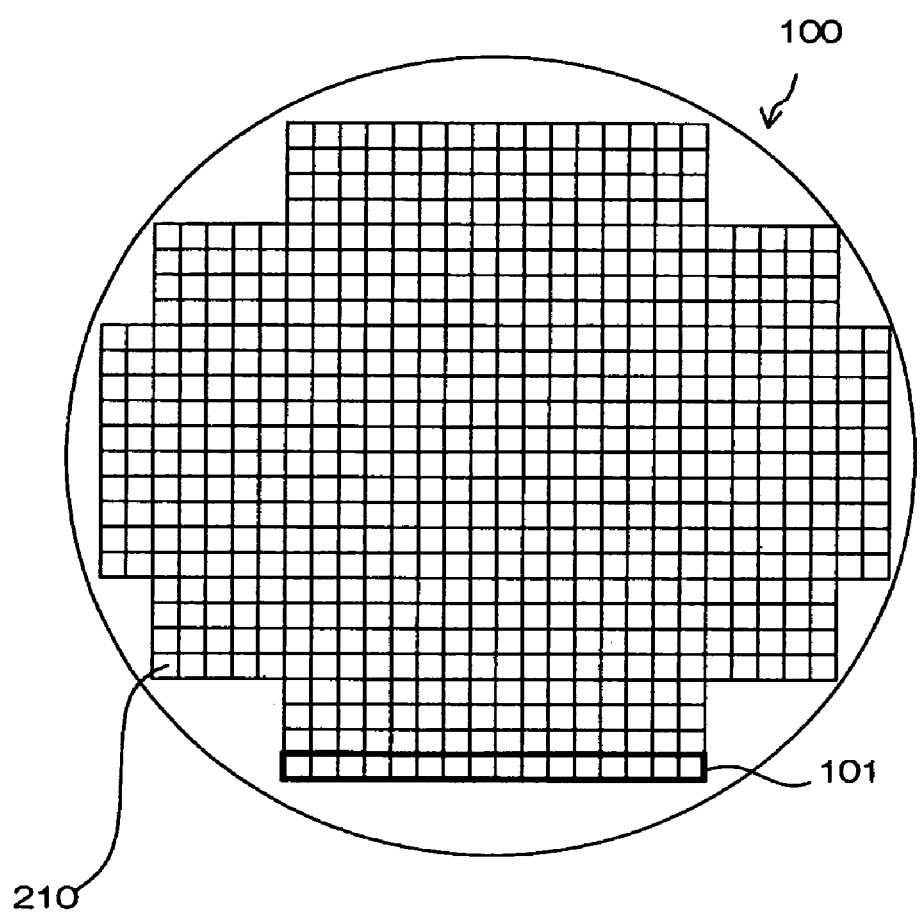
FIG. 6 is a plan view of a wafer that is related to manufacturing of the thin film magnetic head according to the present invention.

Next, a wafer used for manufacturing the aforementioned thin film magnetic head is described below. As shown in FIG. 6, on a wafer 100 is formed at least a laminated body configuring the aforementioned thin film magnetic head. The wafer 101 is divided into a plurality of bars 101, which are work units for polishing the ABS S. After polishing, the bar 101 is cut into sliders 210 each containing a thin film magnetic head. The wafer 100 is provided with cutting margins (not shown here) used for cutting the wafer 100 into bars 101 and the bars 101 into sliders 210.

Figure 7:
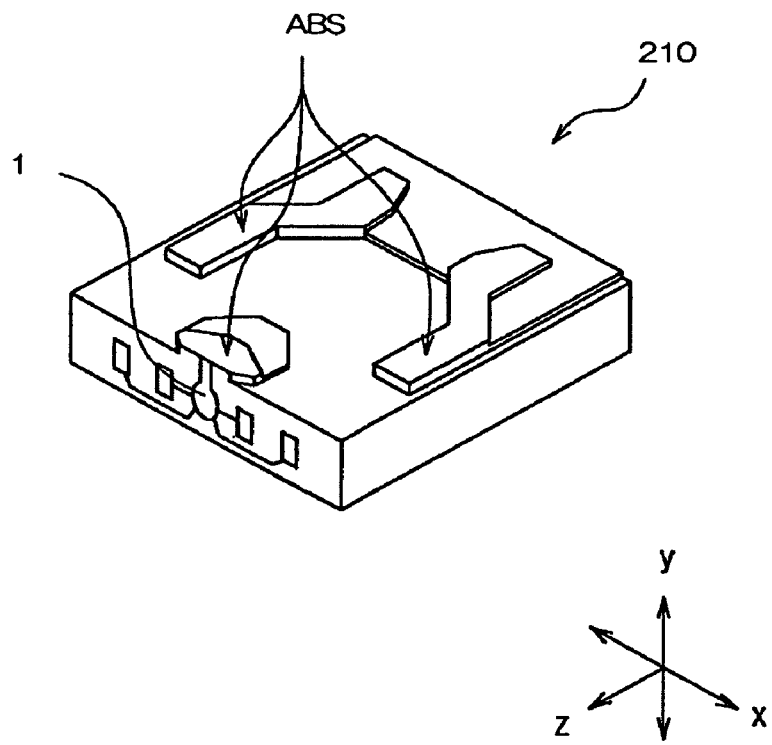
FIG. 7 is a perspective view of a slider with the thin film magnetic head according to the present invention.

As shown in FIG. 7, the slider 210 is substantially hexahedron-shaped. One face thereof is the ABS S that faces a hard disk.

Figure 8:
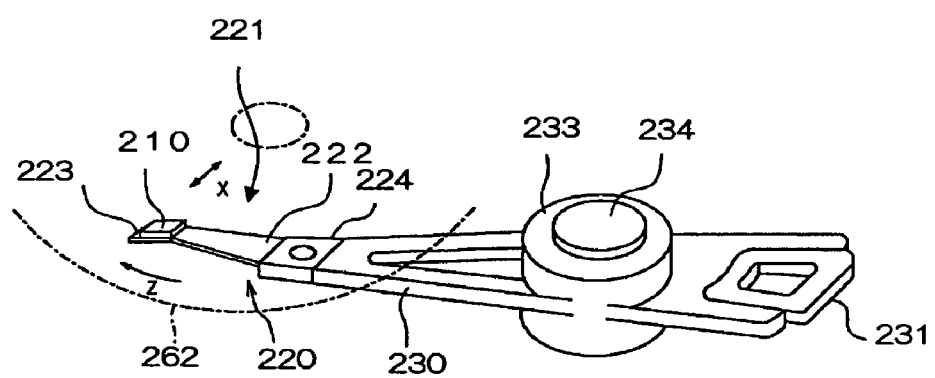
FIG. 8 is a perspective view of a head arm assembly that comprises a head gimbal assembly assembled with the thin film magnetic head according to the present invention.

As shown in FIG. 8, a head gimbal assembly 220 comprises a slider 210 and a suspension 221 for elastically supporting the slider 210. The suspension 221 comprises a spring-set load beam 222 made of stainless steel, a flexure 223 provided on one edge of the load beam 222 and a base plate 224 provided on the other edge of the load beams 222. The flexure 223 is provided with the slider 210, giving a proper degree of freedom. On the section in which the slider 210 is mounted on the flexure 223 is provided a gimbal part for keeping the position of the slider 210 constant.

The slider 210 is placed inside a hard disk device, facing a hard disk, which is a disk-shaped recording medium to be rotated. At a time when a hard disk is rotated in the z direction in FIG. 8, airflow passing through the space between the hard disk and the slider 210 provides lift force for the slider 210 downward in the y direction. The slider 210 is moved away from the surface of the hard disk by the lift force. The thin film magnetic head 1 is formed in the vicinity of the edge portion on the air exit side (i.e., the edge portion on the lower left side in FIG. 7) of the slider 210.

The portion in which the head gimbal assembly 220 is mounted on an arm 230 is referred to as a head arm assembly 221. The arm 230 allows moving the slider 210 in the x direction crossing the track of the hard disk 262. One edge of the arm 230 is mounted on the base plate 224. On the other edge of the arm 230, a coil 231 is mounted, which constitutes part of the voice coil motor. A bearing part 233 is provided in the middle section of the arm 230. The arm 230 is rotatably supported by a shaft 233 mounted on the bearing part 233. The arm 230 and the voice coil motor for driving the arm 230 constitute an actuator.

Figure 9:
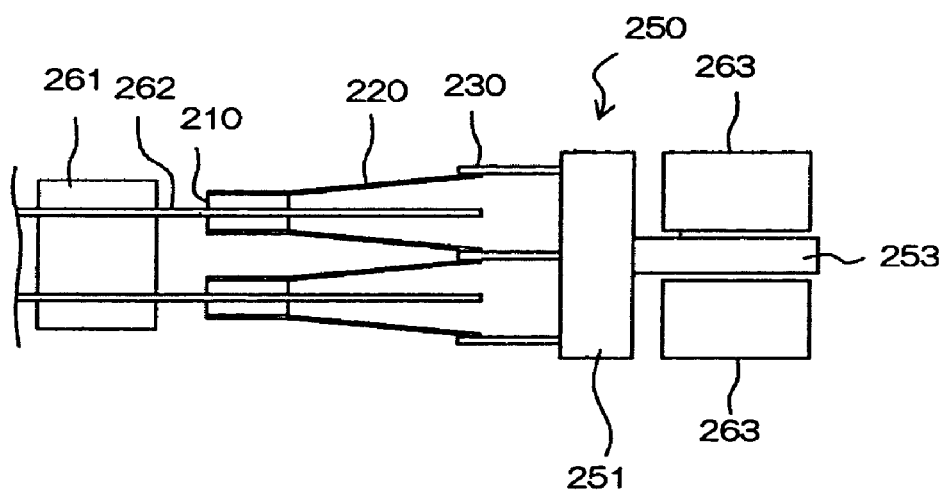
FIG. 9 is a side view of a head arm assembly assembled with the thin film magnetic head according to the present invention.
Figure 10:
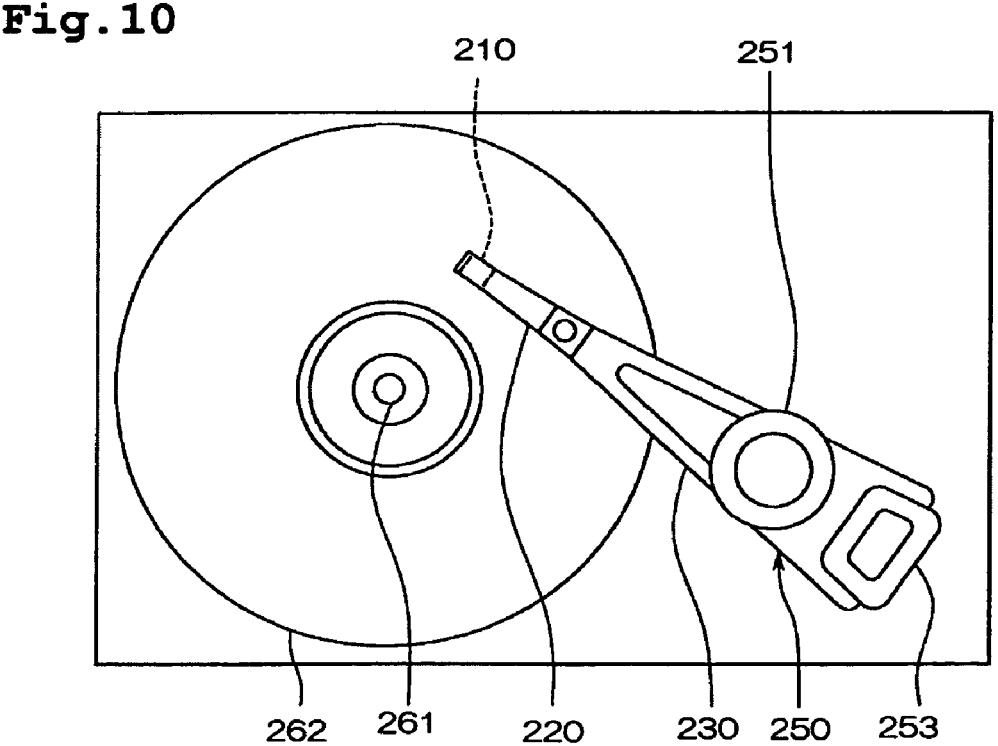
FIG. 10 is a plan view of a hard disk device assembled with the thin film magnetic head according to the present invention.

Next, descriptions of a head stack assembly and a hard disk device into which the aforementioned slider is integrated are given below with reference to FIG. 9 and FIG. 10. The head stack assembly comprises a carriage having a plurality of arms, wherein a head gimbal assembly 220 is mounted on each arm. FIG. 9 is a side view of the head stack assembly. FIG. 10 is a plan view of a hard disk device. The head stack assembly 250 comprises a carriage 251 having a plurality of arms 252. On each arm 252, the head gimbal assembly 220 is mounted at an interval in the vertical direction. On the side of the carriage 251 opposite to the arm 230, the coil 253 is mounted, which constitutes part of a voice coil motor. The voice coil motor has permanent magnets 263 disposed facing each other on both sides of the coil 253.

As shown in FIG. 10, the head stack assembly 250 is integrated into the hard disk device. The hard disk device has multiple hard disks 262 mounted on a spindle motor 261. For each hard disk 262, two sliders 210 are disposed facing each other on both sides of the hard disk 262. The head stack assembly 250 (excluding the slider 210) and an actuator, which correspond to the positioning device according to the present invention, not only support the slider 210 but also position the slider 210 with respect to the hard disk 262. The slider 210 is moved in the direction crossing the track of the hard disk 262 by means of the actuator to be positioned with respect to the hard disk 262. The thin film magnetic head 1 of the slider 210 records information on the hard disk 262 by means of a recording head and reproduces information recorded on the hard disk 262 by means of a reproducing head.

A description of the preferred embodiment according to the present invention was given above in detail. However, it should be appreciated that a wide variety of alterations and modifications are possible as far as they do not depart from the spirit and scope of the attached claims.

What is claimed is:

1. A thin film magnetic head comprising:
    a first synthetic free layer that has a first free layer and a second free layer of which the magnetization directions change according to an applied magnetic field, and a first exchange coupling layer that is provided between the first and second free layers and that exchange-couples the first and second free layers;
    a second synthetic free layer that has a third free layer and a fourth free layer of which the magnetization directions change according to the applied magnetic field, and a second exchange coupling layer that is provided between the third and fourth free layers and that exchange-couples the third and fourth free layers;
    a spacer layer that is provided between the second free layer and the third free layer in contact with both the second free layer and the third free layer, and that has a magnetoresistive effect; and
    a bias magnetic field application layer that is provided in a rear side of the first synthetic free layer and the second synthetic free layer seen from an air bearing surface (ABS), and that applies a bias magnetic field to the first and second synthetic free layers in an orthogonal direction to the ABS, wherein
    a sense current flows in a direction orthogonal to surfaces of the first synthetic free layer, the second synthetic free layer, and the spacer layer,
    the first and second free layers are magnetized in opposite directions of each other in the orthogonal direction to the ABS when the bias magnetic field is applied to the first and second free layers, and are exchange-coupled such that an angle between the magnetization direction of the bias magnetic field and the first free layer is acute and that an angle between the magnetization direction of the bias magnetic field and the second free layer is acute, and
    the third and fourth free layers are magnetized in opposite directions of each other in the orthogonal direction to the ABS when the bias magnetic field is applied to the third and fourth free layers, and are exchange-coupled such that an angle between the magnetization direction of the bias magnetic field and the third free layer is acute and that an angle between the magnetization direction of the bias magnetic field and the fourth free layer is acute.

2. The thin film magnetic head according to claim 1 comprising:
    the first through fourth free layers are rectangular where a size in a track width direction is longer than a size in an orthogonal direction to the ABS.

3. A slider equipped with the thin film magnetic head according to claim 1.

4. A wafer on which a laminated body is formed, the laminated body being configured as the thin film magnetic heads according to claim 1.

5. A head gimbal assembly comprising the slider according to claim 3 and a suspension that elastically supports the slider.

6. A hard disk device comprising the slider according to claim 5 and a device that supports the slider and positions the slider with respect to a recording medium.

7. The thin film magnetic head according to claim 1, wherein the spacer layer is made of:
    (1) one of $MgO$, $Al_2O_3$, $TiO_2$ and AN, and one of a mixture of Cu and $Al_2O_3$ and a mixture of Cu and MgO;
    (2) one of Cu, Ag, Au and Cr; or
    (3) one of ZnO, $SnO_2$, GaN and $In_2O_3$.

* * * * *